2 Sheets--Sheet 1.
G. VAN WINKLE.
Sulky Attachment to Plows.
No. 159,779. Patented Feb. 16, 1875.
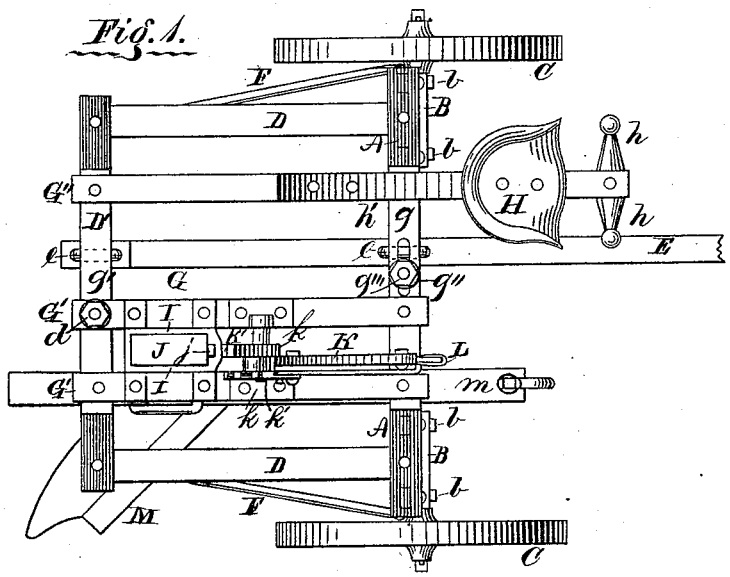
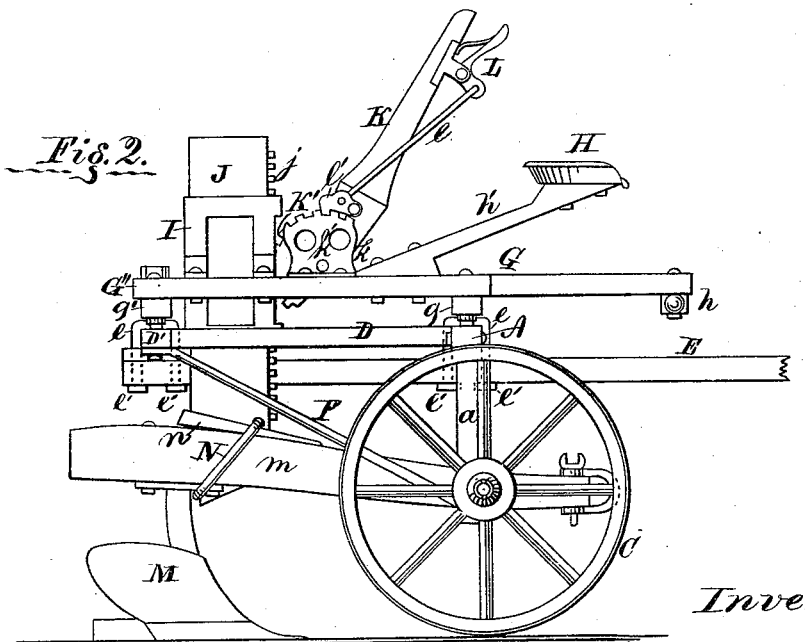

2 Sheets--Sheet 2.
G. VAN WINKLE.
Sulky Attachment to Plows.
No. 159,779. Patented Feb. 16, 1875.
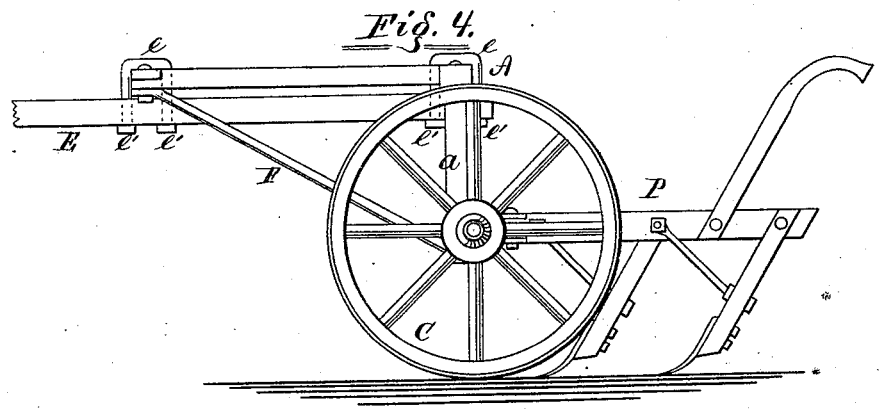
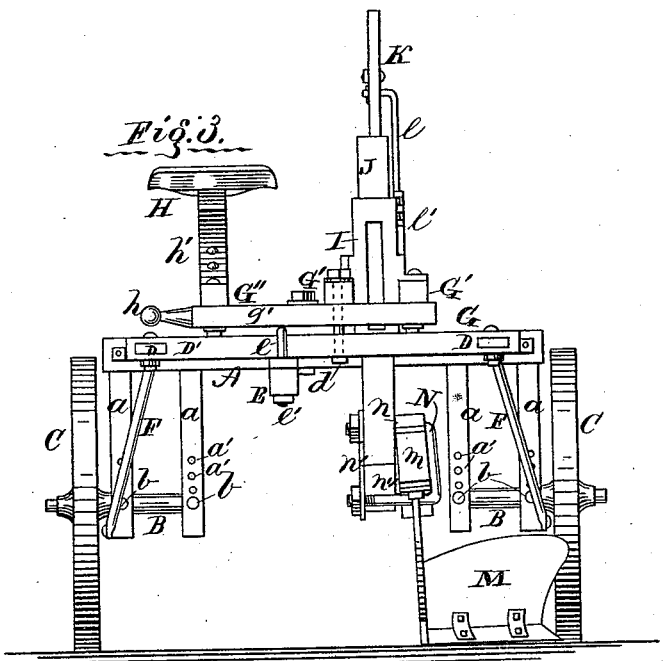
Witnesses:
M. H. Barringer.
J. J. Tunnicliff.
Inventor:
Garrett Van Winkle,
By W. B. Richards.
THE GRAPHIC CO.PHOTO-LITH.39 & 41 PARK PLACE,N.Y.

UNITED STATES PATENT OFFICE.

GARRETT VAN WINKLE, OF AVON, ILLINOIS.

IMPROVEMENT IN SULKY ATTACHMENTS TO PLOWS.

Specification forming part of Letters Patent No. 159,779, dated February 16, 1875; application filed July 22, 1874.

*To all whom it may concern:*

Be it known that I, GARRETT VAN WINKLE, of Avon, county of Fulton and State of Illinois, have invented certain Improvements in Sulky Attachments to Plows, convertible also into frame for walking straddle-row cultivators, of which the following is a specification:

The invention consists partly in the arrangement, upon what may be termed an ordinary cultivator-frame, of a detachable frame, carrying a driver's seat, and a vertically-adjustable bar, to which the plow is attached, said detachable frame being made adjustable to regulate the lateral angularity of the plow to the line of progression; partly in the provision for raising and lowering the sides of the frame independently of each other to adjust the running; and partly in the arrangement of devices for converting the machine into a walking straddle-row cultivator-frame, all as hereinafter fully described.

To enable others skilled in the art to make and use my invention, I will now proceed to describe the same with reference to the accompanying drawings, in which—

Figure 1 is a top plan or view of a machine embodying my invention. Fig. 2 is a side elevation. Fig. 3 is a rear elevation. Fig. 4 is a side elevation rigged as a cultivator.

Referring to the parts by letters, letter A represents an ordinary cultivator-axle, elevated and supported by side bars, $a$. B B are bars, secured to the bars $a$ by bolts $b$, and may be adjusted vertically on said bars by changing the bolts $b$ to different holes of the series $a'$ in the bars $a$. The part of the bars B between each pair of the bars $a$ forms a journal for the cultivator-plows, as hereinafter described, and their projecting ends form spindles for the wheels C C. D D are bars secured to and projecting in rear of the axle A, and connected at their rear ends by a transverse bar, D'. E is the tongue, removably and adjustably attached to the axle A and transverse bar D' by yokes $e\ e$ and nuts $e'\ e'$. F F are braces. G is the upper frame, consisting of the longitudinal bars G' G' G'', connected by transverse bars $g\ g'$. The bar G'' extends forward, as shown in the drawings, and provided with rests $h\ h$ for the driver's feet, the driver's seat H being mounted thereon by a spring-bar, $h'$. The frame G is pivoted at its rear end to the bar D' by a bolt, $d$; and the bar $g$ contains a slot, through which a fixed bolt, $g''$, passes upward from the axle A, and is provided with a nut, $g'''$. I is an open-framed sleeve, supported on the bars G' G', to which it is securely bolted. J is a vertical bar passing through the sleeve I, and carrying on its front side a rack-bar, $j$. K is a hand-lever, pivoted at its lower ends in the standards $k\ k$, and provided with a segmental rack, K', which gears with the rack-bar $j$. The hand-lever K is provided with an ordinary thumb-lever, L, which is connected, by a rod, $l$, with a dog, $l'$, which engages with a cogged rack, $k'$, upon the upper end of one of the standards $k$. M is an ordinary plow, and $m$ the plow-beam, passed through a yoke, N, which projects in a diagonal position from the side of the lower end of the bar J, and is further secured therein by a wedge, $n$, on its upper side. The yoke N is made to fit the beam $m$ loosely, so that a system of wedges, $n'$, may be used to adjust the vertical and lateral angularity of the plow, as shown plainly at Fig. 3. P is an ordinary cultivator-plow, attached, by any ordinary joint $p$, to the bar B.

The operation of my invention is as follows: The draft-animals may be attached to the forward end of the beam $m$ in any ordinary manner. The frame G may then be adjusted by oscillating it on the pivot-bolt $d$, and its desired position fixed by the bolt $g''$, and in this manner the lateral angularity of the beam $m$ to the line of progression be adjusted, thereby adapting the plow to two or three horse use, and to take more or less land, as desired. The pitch or lateral inclination of the plow may be adjusted by the side wedge, $n'$, and the plow raised or lowered, and its depth of running regulated in the obvious manner, by the hand-lever K, by the driver from his seat H. The right-hand wheel C should run in the open furrow last made, and the bars B may be adjusted on the bars $a$ to keep the axle A level.

To convert the device into a cultivator-frame, the frame G should be removed, and with it, of course, the plow. The tongue E is then reversed in its direction across the axle A and bar D', and, being placed about centrally transversely thereon, is secured in position. The cultivator-plows may then be attached to the bars B in any of the ordinary styles, the draft-animals being then attached to the tongue E by the ordinary double-trees, and the machine drawn forward with the opposite end ahead to that hereinbefore described when the plow was used.

Having now described my invention, what I claim as new, and desire to secure by Letters Patent, is—

1. The frame G, constructed as described, pivoted to the bar D', and laterally adjustable upon the axle A, and arranged to operate with the plow M and bar K, substantially as and for the purpose specified.

2. The bars B, adjustably attached to the bars $a$, and combined with the axle A and bar D', for adjusting the plow-frame and attaching cultivators, substantially as described, and for the purpose specified.

3. The draft-pole E, removably and reversibly attached to the bar D' and axle A, and arranged to operate with the said parts, and with the cultivator-plows P and frame G, interchangeably, substantially as described, and for the purpose specified.

4. The hand-lever K, racks $j$, K', and $k'$, bar J, sleeve I, and plow M, in combination with the pivoted frame G, axle A, and bar D', substantially as and for the purpose specified.

GARRETT VAN WINKLE.

Witnesses:
R. W. TOWNSEND,
A. J. CHURCHILL.